United States Patent [19]

Paul et al.

[11] Patent Number: 4,663,620

[45] Date of Patent: May 5, 1987

[54] MODIFIED CROSSBAR SWITCH OPERATION WITH FIXED PRIORITY CONFLICT RESOLUTION AND APPARATUS FOR PERFORMING SAME

[75] Inventors: Wolfgang J. Paul, San Jose; Nicholas J. Pippenger, Los Gatos, both of Calif.

[73] Assignee: International Business Machines Corporation, Armonk, N.Y.

[21] Appl. No.: 772,835

[22] Filed: Sep. 5, 1985

[51] Int. Cl.[4] ........................... H04Q 9/00; H04J 3/04
[52] U.S. Cl. ........................... 340/825.5; 340/825.79; 370/112
[58] Field of Search ........................ 340/825.5, 825.79; 370/112, 85

[56] References Cited

U.S. PATENT DOCUMENTS

| | | | |
|---|---|---|---|
| 3,553,656 | 1/1971 | Bernhardt | 340/825.5 |
| 4,199,661 | 4/1980 | White et al. | 340/825.5 |
| 4,380,065 | 4/1983 | Hirtle et al. | 340/825.5 |
| 4,560,985 | 12/1985 | Strecker et al. | 340/825.5 |

Primary Examiner—Donald J. Yusko
Attorney, Agent, or Firm—R. Bruce Brodie

[57] ABSTRACT

A method for altering fixed priority conflicts in accessing crossbar switches interconnecting processor-to-processor communications. A fixed priority conflict resolution is substituted for random conflict resolution. There is utilized a method of random restraint for the purpose of restoring the symmetry of access. This is performed by way of a random experiment at each processor using a local threshold parameter and permitting access only when the experimental value exceeds the threshold.

5 Claims, 5 Drawing Figures

```
/0REQUEST  /1REQUEST  /2REQUEST  /3REQUEST  /4REQUEST
/5REQUEST  /6REQUEST  /7REQUEST  NC         GND
NC         /7GRANT    /6GRANT    /5GRANT    /4GRANT
/3GRANT    /2GRANT    /1GRANT    /0GRANT    VCC

0GRANT  = /0REQUEST

1GRANT  = /0REQUEST* 1REQUEST

2GRANT  = /0REQUEST*/1REQUEST* 2REQUEST

3GRANT  = /0REQUEST*/1REQUEST*/2REQUEST* 3REQUEST

4GRANT  = /0REQUEST*/1REQUEST*/2REQUEST*/3REQUEST
          * 4REQUEST

5GRANT  = /0REQUEST*/1REQUEST*/2REQUEST*/3REQUEST
          */4REQUEST* 5REQUEST

6GRANT  = /0REQUEST*/1REQUEST*/2REQUEST*/3REQUEST
          */4REQUEST*/5REQUEST* 6REQUEST

7GRANT  = /0REQUEST*/1REQUEST*/2REQUEST*/3REQUEST
          */4REQUEST*/5REQUEST*/6REQUEST* 7REQUEST
```

PAL16LD8 PRIORITY CIRCUIT

FIG. 3

```
/0GRANT  /1GRANT  /2GRANT  /3GRANT  /4GRANT
/5GRANT  /6GRANT  /7GRANT  DATA0    GND
DATA1    NC       DATA2    DATA3    DATA4
DATA5    DATA6    DATA7    OUTPUT   VCC

OUTPUT = 0GRANT* DATA0
       + 1GRANT* DATA1
       + 2GRANT* DATA2
       + 3GRANT* DATA3
       + 4GRANT* DATA4
       + 5GRANT* DATA5
       + 6GRANT* DATA6
       + 7GRANT* DATA7
```

PAL16HD8 · FORWARD MUX, BACKWARD MUX

FIG. 4

MODIFIED CROSSBAR SWITCH OPERATION WITH FIXED PRIORITY CONFLICT RESOLUTION AND APPARATUS FOR PERFORMING SAME

TECHNICAL FIELD

This invention relates to parallel processors and, more particularly, to altering fixed priority conflicts in accessing crossbar switches interconnecting processor-to-processor communications.

BACKGROUND

In the prior art, White et al, U.S. Pat. No. 4,199,661, "Method and Apparatus for Eliminating Conflicts on a Communication Channel", issued Apr. 22, 1980, shows that it is broadly known to alter a fixed priority protocol among a plurality of processors accessing a common channel to create another type of bias. As applied to crossbar switches, taken either singly or in multistage networks, these fixed priority protocols have been used in the implementation of processor-to-processor interconnections in highly parallel computers.

For purposes of this invention, a parallel computer is taken to mean any set of communicating processors.

For the purpose of this invention, a d-X-d crossbar switch comprises two sets of ports I(i) (inputs) and O(j) (outputs) and a set of switches s(ij), where i and j range from 1 to d. Each of the switches s(ij) can be open or closed. The effect of closing switch s(ij) is to establish a connection between port I(i) and port O(j). The connection can be unidirectional (data is only sent from inputs I(i) and outputs O(j)) or bidirectional (data can be sent back and forth between I(i) and O(j)). Also, for each i, at most one switch s(ij) is closed at any time; i.e. each I(i) is connected to at most one O(j). However, if multiple inputs i desire to transmit to a single output j, conflicts arise.

Prior art implementation has been designed upon several common assumptions. The first assumption is that the origin and destinations of messages are uniformly distributed. A second assumption is that the origin and destinations of different messages are independent. A third assumption is that conflicts among inputs of a crossbar for access to an output of the crossbar are resolvable by uniform and independent random selection of one of the competing inputs. By "random selection", it is meant either one based on the outcome of a truly random physical experiment, or one based on the outcome of a pseudo-random mathematical process.

It is believed that uniformity of traffic can be achieved by an appropriate design of communication protocols executable by the processors. Independence of traffic can be ensured by transmitting each message in two phases through a uniformly and independently selected intermediate processor. Thus, departures from independence of traffic should cause no more than a factor of two degradation.

Random conflict resolution can be ensured by design of the crossbars. However, this may be costly for two reasons. First, either random numbers must be generated in the processors, transmitted with the messages and captured by the crossbars, or they must be generated by the crossbars themselves. Second, the uniform selection of a competing input is a logically complicated function requiring many gates for its realization.

Illustratively, conflict resolution occurs between inputs $i_1, \ldots, i_s$. First, where a local random experiment is performed, it is necessary to determine the number of conflicting requests s. Next, it is necessary to pick a random number r between $1, \ldots, s$ and connect the input $i_r$ to the output. Alternatively, the processors send random numbers $r_1, \ldots r_s$ together with a request to connect $i_1, \ldots, i_s$ to a predetermined output. In this regard, it is necessary to receive $r_1, \ldots, r_s$, determine the largest, say $r_{max}$ (not guaranteed to resolve conflict). Lastly, it is necessary to connect the input $i_{max}$. It is also to be noted that the above mechanism has to be replicated for each output.

THE INVENTION

It is accordingly an object of this invention to devise a method for modifying the resolution bias of a crossbar switch having fixed priority resolution. It is a related object that such method avoids the cost and delay associated with the random conflict resolution of the prior art.

The foregoing objects are satisfied by replacing the above-described method of random conflict resolution by a fixed priority conflict resolution together with random restraint on the side of the participating processors.

The invention is manifest as a method for modifying the resolution bias of a crossbar switch having a fixed priority resolution, the switch communicatively coupling requesting ones of a plurality of processors. The method steps comprise (a) setting a threshold at each processor such that there exists a bias created in favor of the lowest priority processors; and (b) at each processor, performing a random experiment whose outcome determines whether the processor accesses the switch by generating a random number and then accessing the switch only if the number exceeds the threshold. The threshold magnitudes are functions of the number of processors and their priority, which processors constitute the parallel computer.

BRIEF DESCRIPTION OF THE DRAWING

FIGS. 3 and 4 show program array logic relations for the PAL16LD8 unit (priority circuit) and the PAL16HD8 units (forward, backward MUX), respectively, required in the FIG. 2 implementation of the FIG. 1 logic arrangement.

DESCRIPTION OF THE PREFERRED EMBODIMENT AND INDUSTRIAL APPLICABILITY

Figure 1:
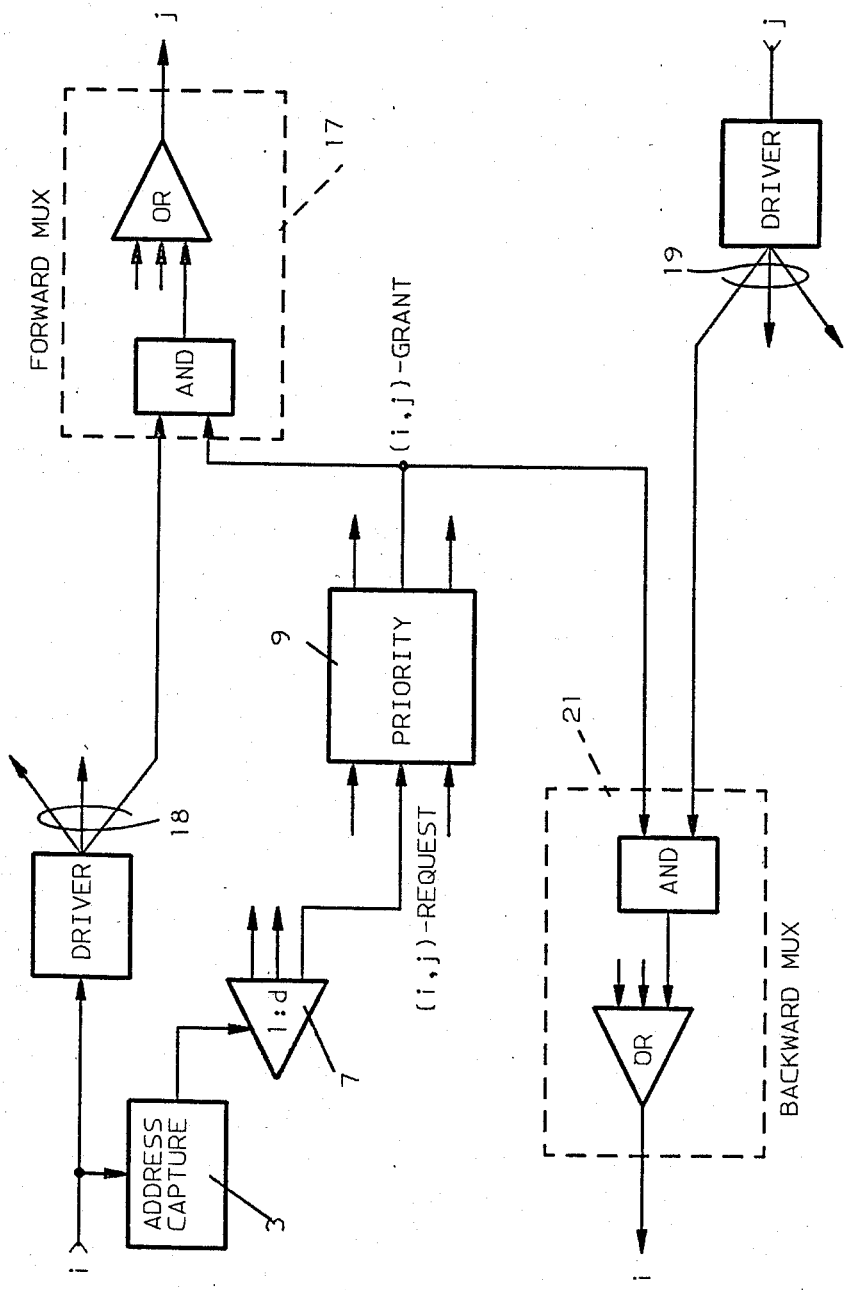
FIG. 1 sets out logic and gating for switchably interconnecting processors through a crosspoint connecting matrix.

Referring now to FIG. 1, there is shown an illustration of a priority crossbar for practicing the method of the invention. Each input, of which only the ith is depicted, is monitored by circuitry (1,3,7). This circuitry detects requests for connection to an output 18 and captures the address 3 of the requested output. A one-out-of-d circuit 7 provides a signal indicating that the ith input requests connection to the jth output, i.e. the (i,j) request. For each output, a priority circuit 9 resolves conflicts among inputs for connection to the output. Also, the priority circuit provides, for each input i and for each output j, a signal indicating that the ith input is granted access to the jth output. These signals are used by multiplexers 17 and 21. The multiplexers provide appropriate forward paths 18 for each output and backward paths 19 for each input. An obvious use for the backward connection is to send an acknowledge signal from a receiving processor to a sending processor, so that the sending processor knows that his request has been granted.

Priority circuit 9 grants access to the ith input if the ith input requests connection, but the first through the $(i-1)$ inputs do not request connection.

With random conflict resolution, it is assumed that during each cycle each processor independently originates a message with probability p and that all the destinations of all messages are uniformly and independently distributed over all processors. With fixed priority conflict resolution, it is further assumed that each processor i originating a message actually attempts to transmit the message, only with probability $q_i$, independently of the attempts of all other processors. In the method of this invention, it is desired to select the parameters $q_i$ such that they equalize the throughputs of the processors and achieve the highest throughput consistent with equality.

Consider first a single d-X-d crossbar with random conflict resolution. The probability that a particular input requests connection to some output is p, and the probability that some input is granted access to a particular output is $1-(1-p/d)_d$. This expectation is in turn equal to the throughput per processor.

Consider next a $d(1) \ldots d(k) - X - d(1) \ldots d(k)$ delta network as described by Patel, "Performance of Processor Memory Interconnections for Multiprocessors", IEEE Transactions on Computers, 1981, pp. 771-780. Then for $1 \leq j \leq k$, and letting $p_j$ denote the throughput per processor for the first j stages, it follows that:

$$p_0 = p \text{ and for } 1 \leq j \leq k, p_j = 1 - (1 - p_{(j-1)}/d(j))^{d(j)}.$$

In the case $d(1) = \ldots = d(k) = d$, $p_j = f(p_{j-1})$, where $f(x) = 1 - (1 - x/d)^d$. Since $f(x) = x - ((d-1)/2d)x^2 + O(x^3)$, $p_k$ is asymptotic to $2d/(d-1)k$ as k approaches infinity with d fixed.

Turning now to priority conflict resolution, consideration must first be given to a single $d - X - d$ crossbar. The probability that input i requests access to output j is $(pq_j)/d$. The probability that input i is granted access to output j is $(pq_i)(1 - pq_{i-1}) \ldots (1 - pq_1)$. Equating these probabilities for $i = 1, \ldots, d$ yields the recurrence $(1/pq_i) = (1/pq_{i+1}) + (1/d)$. In order to maximize the common throughput, $q_d$ is set equal to one yielding $(1/pq_i) = (1/p) + ((d-i)/d)$. The throughput per processor is $(pq_1) = (dp/(d + (d-1)p))$.

Considering the case of a $d(1) \ldots d(k) - X - d(1) \ldots d(k)$ delta network, by similar reasoning to the above there can be derived the relation $$(1/pq_i) = ((1/p) + (d(1) - i(1))/d(1)) + \ldots + ((d(k)),$$

where processor i is connected to the i(1) input of a crossbar in the first stage and the i(k) inputs of crossbars in the kth stage.

The throughput per processor is $$pd(1) \ldots d(k)/\{d(1) \ldots d(k) + p[d(1) - 1] \ldots d(k) + \ldots + pd(1) \ldots [d(k) - 1]\}.$$

Thus, in the case $d(1) = \ldots d(k) = d$, if $Q_k$ denotes the throughput per processor for a k stage network, then $Q_0 = p$ and $Q_j = g(Q_{j-1})$, where $g(x) = dx/(d + (d-1)x)$. Since $g(x) = x - ((d-1)/d)x^2 + O(x^3)$, $Q_k$ is asymptotic to $d/(d-1)k$ for $g(x) = x - ((d-1)/d)x$ $k \to \infty$ with d fixed.

The foregoing calculations can be summarized in the following way. If $pq_i$ is regarded as the "aggressivity" of the ith processor, then $1/pq_i$ may be regarded as its "timidity". The parameters $q_i$ should be chosen so that the timidities of the inputs to a $d - X - d$ crossbar form an arithmetic progression with increment $1/d$.

Figure 2A:
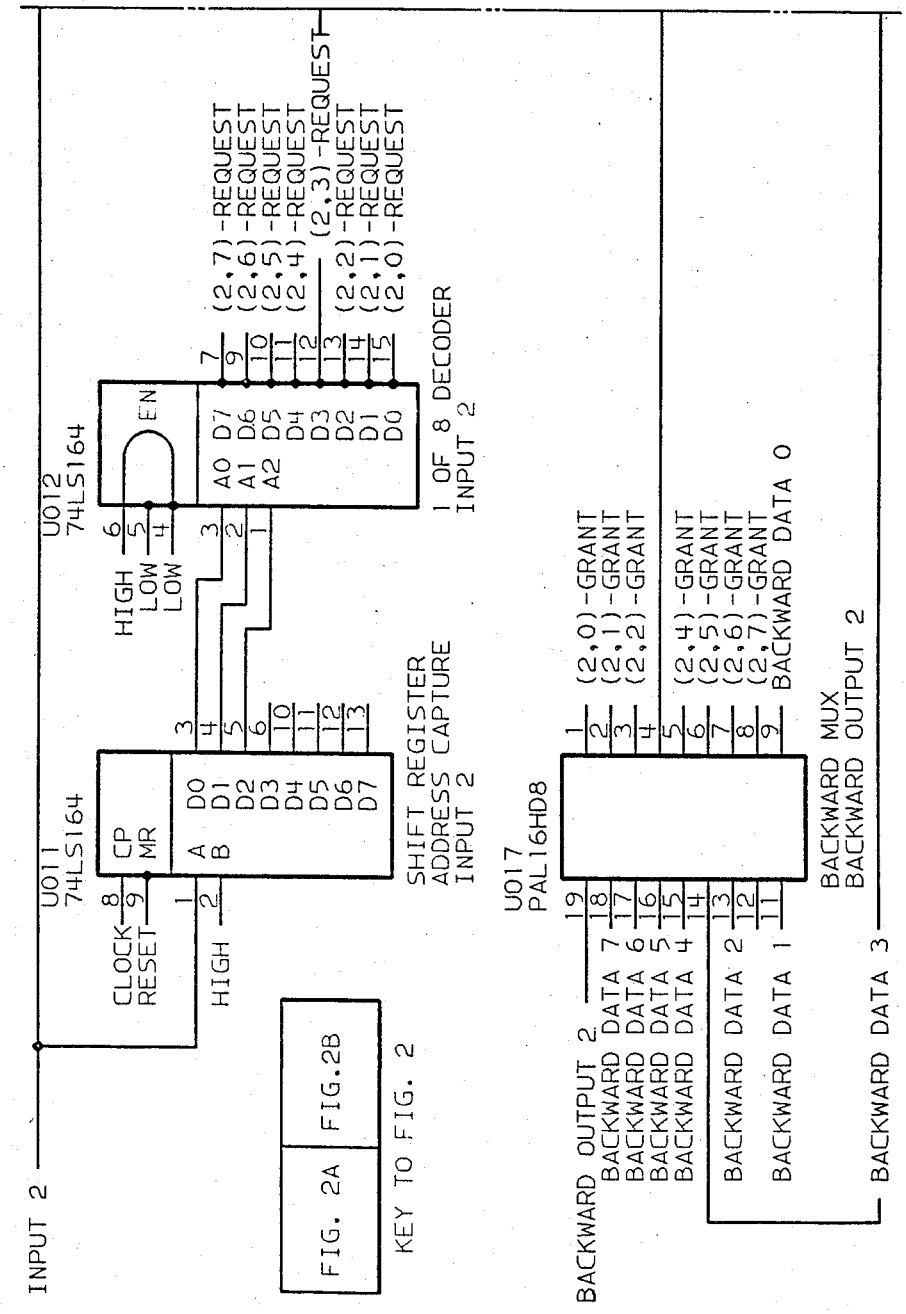
FIGS. 2A and 2B depict a logic detail of a priority resolution circuit as shown in FIG. 1.
Figure 2B:
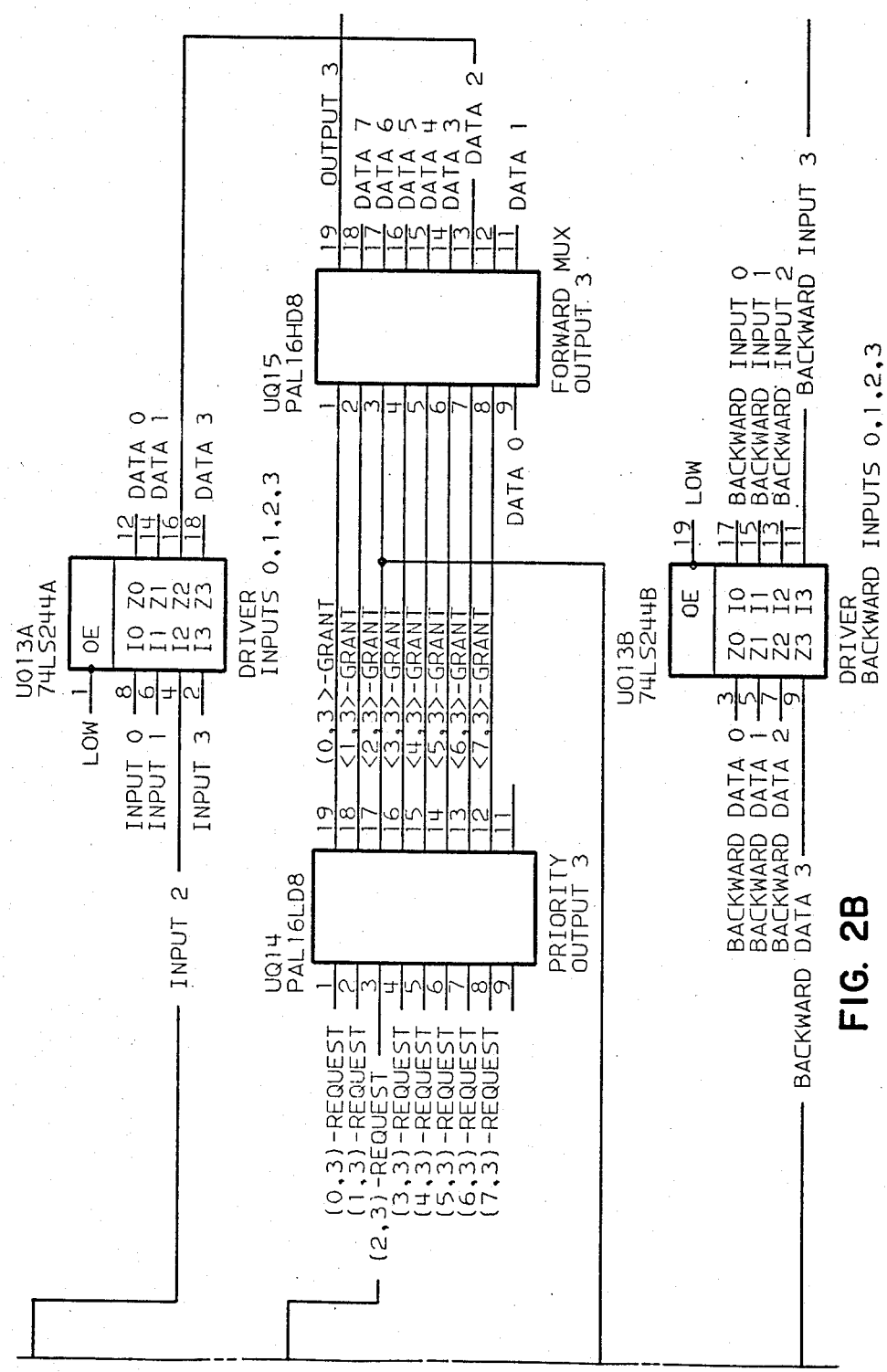

FIG. 2 is an implementation detail of FIG. 1 using TTL components for an $8 \times 8$ crossbar with fixed conflict resolution. Only the path from input I(2) to output O(3) and the associated backward path are shown.

Addresses are captured by sequentially clocking the 3-bit destination address for input 2 into a shift register (U011). The 1-of-8 circuit comes straight out of the catalog (U012). The priority circuit is realized as a PAL (U014). The PAL equations are in FIG. 3. Forward MUX (U015) and backward MUX (U017) are realized as PALs. The same PAL equations can be used for both PALs. They are in FIG. 4. LS244 chips are used for drivers. Each such component contains eight drivers. Thus, forward drivers and backward drivers for several inputs and backward inputs can share the same component (U013A, U013B).

We claim:

1. A method for modifying the resolution bias of a crossbar switch having a fixed priority resolution, said switch communicatively coupling requesting ones of a plurality of processors, comprising the steps of:
   (a) setting a magnitude threshold at each processor such that there exists a bias created in favor of the lowest priority processors, the thresholds being set among a predetermined order of processors in harmonic progression; and
   (b) at each processor, the further steps of generating a random number-coded signal, magnitude comparing the random number with the threshold, and causing the processor to access the switch only upon the condition that the number magnitude exceeds that of the threshold.

2. A method according to claim 1, wherein the step of generating a random number-coded signal includes selectively utilizing the numerically-coded outcome of either a random experiment or of random-like short run of a deterministic experiment.

3. A method for modifying the resolution bias of a crossbar switch having a fixed priority resolution, said switch communicatively coupling requesting ones of a plurality of processors, comprising the steps of:
   (a) setting a magnitude threshold at each proccessor such that there exists a bias created in favor of the lowest priority processors, the thresholds being set among a predetermined order of processors in harmonic progression; and
   (b) at each processor, the further steps of:
      (1) generating a random number-coded signal;
      (2) magnitude comparing the random number with the threshold; and
      (3) causing the processor to access the switch only upon the condition that the random number magnitude satisfies a predetermined inequality relation with respect to the threshold.

4. The method according to claim 3, wherein the harmonic progression forms either an arithmetric progression or a geometric progression.

5. The method according to claim 3, wherein the inequality relation is selected from the set of relations consisting of "greater than", "less than", "greater than or equal to", and "less than or equal to".

* * * * *